US010477603B2

(12) United States Patent
Sharma et al.

(10) Patent No.: US 10,477,603 B2
(45) Date of Patent: Nov. 12, 2019

(54) COMMUNICATION SYSTEM

(71) Applicant: NEC Corporation, Minato-ku, Tokyo (JP)

(72) Inventors: Vivek Sharma, London (GB); Robert Arnott, London (GB); Hisashi Futaki, Tokyo (JP); Yuhua Chen, London (GB)

(73) Assignee: NEC CORPORATION, Tokyo (JP)

(*) Notice: Subject to any disclaimer, the term of this patent is extended or adjusted under 35 U.S.C. 154(b) by 358 days.

(21) Appl. No.: 15/307,467

(22) PCT Filed: Mar. 25, 2015

(86) PCT No.: PCT/JP2015/060304
§ 371 (c)(1),
(2) Date: Oct. 28, 2016

(87) PCT Pub. No.: WO2015/170530
PCT Pub. Date: Nov. 12, 2015

(65) Prior Publication Data
US 2017/0048912 A1 Feb. 16, 2017

(30) Foreign Application Priority Data
May 9, 2014 (GB) .................................. 1408276.2

(51) Int. Cl.
H04W 76/15 (2018.01)
H04W 76/11 (2018.01)
(Continued)

(52) U.S. Cl.
CPC ............. H04W 76/15 (2018.02); H04L 43/00 (2013.01); H04L 43/0852 (2013.01);
(Continued)

(58) Field of Classification Search
CPC combination set(s) only.
See application file for complete search history.

(56) References Cited

U.S. PATENT DOCUMENTS 8,467,351 B2* 6/2013 Liu .................. H04W 36/0094
370/332
2012/0314569 A1 12/2012 Liu et al.
(Continued)

FOREIGN PATENT DOCUMENTS

| CN | 103229583 A | 7/2013 |
| CN | 103262642 A | 8/2013 |
| JP | 2014-500662 A | 1/2014 |

OTHER PUBLICATIONS

3rd Generation Partnership Project; Technical Specification Group Radio Access Network, "A common user plane architecture for dual connectivity", Ericsson, 3GPP TSG-RAN WG2 #84, R2-134224, Nov. 11-15, 2013, San Francisco, USA, 4 pages.
(Continued)

Primary Examiner — Hicham B Foud

(57) ABSTRACT

A communication system is disclosed, in which a mobile communication device communicates user data using a communication bearer provided via a first base station and a second base station of the communication system. The base stations are configured to determine a packet delay for communicating user data using said communication bearer based on the time when the first base station started PDCP processing for a data packet communicated using said communication bearer, and based on the time when the data packet was acknowledged by said mobile communication device to the second base station.

11 Claims, 8 Drawing Sheets split bearer (downlink)

(51) Int. Cl.
*H04L 12/26* (2006.01)
*H04W 72/08* (2009.01)
*H04W 28/08* (2009.01)
*H04W 88/10* (2009.01)

(52) U.S. Cl.
CPC .......... *H04W 72/085* (2013.01); *H04W 76/11* (2018.02); *H04W 28/08* (2013.01); *H04W 88/10* (2013.01)

(56) References Cited

U.S. PATENT DOCUMENTS

2013/0294365 A1  11/2013  Zakrzewski
2013/0301559 A1  11/2013  Zakrzewski
2014/0056243 A1   2/2014  Pelletier et al.

OTHER PUBLICATIONS

Japanese Office Action for JP Application No. 2017-510799 dated Nov. 15, 2017 with English Translation.

3rd Generation Partnership Project; Technical Specification Group Radio Access Network; "Study on Small Cell enhancements for E-UTRA and E-UTRAN"; Higher layer aspects (Release 12), 3GPP TR 36.842 V12.0.0 (Dec. 2013).

3rd Generation Partnership Project; Technical Specification Group Radio Access Network; "Evolved Universal Terrestrial Radio Access (E-UTRA)"; Layer 2—Measurements (Release 11), 3GPP TS 36.314 V11.1.0 (Dec. 2012).

3rd Generation Partnership Project; Technical Specification Group Radio Access Network; "Evolved Universal Terrestrial Radio Access Network (E-UTRAN)"; X2 application protocol (X2AP) (Release 12), 3GPP TS 36.423 V12.1.0 (Mar. 2014).

3rd Generation Partnership Project; Technical Specification Group Radio Access Network; "Measurement gap configuration in Dual Connectivity", NTT DOCOMO, Inc., 3GPP TSG-RAN WG2 #85bis, R2-141236, Mar. 31-Apr. 4, 2014, pp. 1-2.

3rd Generation Partnership Project; Technical Specification Group Radio Access Network; "Analysis on layer 2 measurements considering dual connectivity", 3GPP TSG RAN WG2 Meeting #84, R2-134052, San Francisco, USA, Nov.11-Nov. 15, 2013.

Chinese Office Action for CN Application No. 201580037175.2 dated Feb. 3, 2019 with English Translation.

* cited by examiner

COMMUNICATION SYSTEM

TECHNICAL FIELD

The present invention relates to a communication system and to components thereof for providing communication services to mobile or fixed communication devices. The invention has particular, but not exclusive, relevance to connectivity via multiple base stations in Long Term Evolution (LTE) Advanced systems as currently defined in associated 3rd Generation Partnership Project (3GPP) standards documentation.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane (e.g. Packet Data Convergence Protocol (PDCP), Radio Link Control (RLC), Medium Access Control (MAC) and PHYsical (PHY) layers) and control-plane (e.g. Radio Resource Control (RRC)) protocol terminations towards the UE.

Recent developments in communication networks have seen increased deployment of so called 'small' cells operated by Low Power Nodes (LPNs), such as pico eNBs, femto eNBs, home eNBs (HeNBs) or the like, which cells have a smaller coverage area than existing macro cells operated by a higher power (regular) macro base station. Networks comprising a number of different cell types, for example a network comprising a macro cell and a femto cell, are referred to as Heterogeneous Networks, or HetNets. In the following description the term base station is used to refer to any such macro base station or LPN.

In a related art, a mobile telephone is configured to communicate via one base station (using an associated radio link). However, in a study on small cell enhancements for E-UTRA and E-UTRAN (3GPP technical report (TR) no. 36.842 (V12.0.0), the contents of which are incorporated herein by reference), a so-called 'dual connectivity' functionality was introduced to improve, for example, the coverage of high data rates for user equipment, temporary network deployment, cell edge throughput and/or to increase system throughput. The dual connectivity feature established techniques for compatible mobile telephones (and other user equipment) to communicate with multiple network points, substantially simultaneously. Specifically, this 'dual connectivity' functionality refers to an operation mode where a given mobile telephone (operating in RRC CONNECTED mode) consumes radio resources provided by at least two different network points (e.g. two or more base stations). Typically, one of the network points involved in the dual connectivity functionality is a macro base station and the other network point (or a plurality of network points) comprises a low power node (or plurality of low power nodes).

Each network point involved in the provision of dual connectivity for a mobile telephone may assume a different role. One of the network points may be referred to as a master base station (MeNB) and each one of the other network points may be referred to as a secondary base station (SeNB). Typically, the various secondary base stations involved in the provision of dual connectivity are coupled (to the MeNB and hence the core network) via a so-called non-ideal backhaul. Further, in a dual connectivity scenario, one of the base stations (the MeNB) routes control plane signalling to the core network via an associated interface (e.g. the S1 interface), regardless of whether or not the other base station is also connected to the core network for user plane communication (e.g. to a serving gateway).

The MeNB/SeNB roles do not necessarily depend on each base station's capabilities/type (e.g. power class) and may be different for different mobile telephones (even when using the same base stations).

In accordance with the dual connectivity functionality, a mapping between the mobile telephone's radio (communication) bearer(s) and the base stations may be realised as follows:

Radio Bearer served by the MeNB only (MeNB-specific bearer);
Radio Bearer served by the SeNB only (SeNB-specific bearer); and
Radio Bearer served by MeNB and SeNB (split bearer).

3GPP technical specification (TS) 36.314 (V11.1.0) defines a number of layer 2 (L2) measurements that may be performed by the base stations. Such measurements include, for example, one or more of:

measurement of physical resource block (PRB) usage (i.e. to measure usage of time and frequency resources);
measurement of received random access preambles;
measurement of number of active UEs;
measurement of packet delay;
measurement of data loss (i.e. to measure data packets that are dropped due to congestion, traffic management, etc.); and
measurement of scheduled Internet Protocol (IP) throughput.

A base station can calculate downlink packet delay based on appropriate 'arrival' time point measurements (or 'time stamps') provided by the base station's PDCP entity (e.g. specifying the point in time when a particular data packet was received at the PDCP layer from upper layers) and 'receipt' time point measurements (or 'time stamps') provided by the base station's MAC entity (e.g. specifying the point in time when a particular data packet was confirmed to have been successfully received by the UE). The packet delay may be calculated for a single packet (e.g. as the time difference between the two time stamps associated with that single packet), or it can be calculated as an average value (e.g. the sum of time differences between respective pairs of arrival and receipt time stamps over the number of data packets).

The inventors have realised that, in the split bearer scenario, difficulties arise in performing packet delay measurements by the base stations (both the MeNB and the SeNB) when the PDCP and MAC functionalities (for the same bearer, or for different bearers) reside in different base stations.

Specifically, because the PDCP and MAC functionalities (for a given bearer) may reside in different base stations (e.g. the PDCP functionality may reside in the MeNB and (at least part of) the MAC functionality may reside in the SeNB—although part of the MAC functionality may reside in the MeNB), it may be impossible to calculate and report the packet delay measurements. In more detail, since the calculation of downlink packet delays is based on input (e.g. a respective time stamps) provided by both the PDCP layer and the MAC layer, when these layers are provided by different base stations (for split bearers), it may be impossible to calculate and report the packet delay measurements.

Further, when the calculation of the packet delay is based on averaging the respective packet delays for a plurality of data packets belonging to different communication bearers, the calculation can only use time stamp pairs of the non-split bearers thus it may not give an accurate picture of the actual packet delay for the split bearers (which would be most probably higher due to the involvement of at least two base stations rather than a single base station in case of non-split bearers).

DISCLOSURE OF THE INVENTION

Accordingly, preferred embodiments of the present invention aim to provide methods and apparatus which overcome or at least partially alleviate at least one of the above issues.

In one aspect, the invention provides a base station apparatus comprising a first base station and a second base station configured to operate as part of a dual connectivity configuration in which a communication bearer between a core network and a user communication device is provided via the said base station and said second base station, the base station apparatus comprising: means for establishing said communication bearer with said user communication device via a communication link over a base station to base station interface between said first base station and said second base station, wherein said communication bearer comprises: a first part, in one of said first base station and said second base station, where first processing is performed; and a second part, in the other of said first base station and said second base station, where second processing is performed; and means for obtaining: i) first time information representing a time when said first processing started, in said one of said first base station and said second base station, for a data packet communicated using said communication bearer; and ii) second time information representing a time when at least part of said data packet communicated using said communication bearer was acknowledged, in said other of said first base station and said second base station, by said mobile communication device; and means for determining a packet delay based on said obtained first time information and second time information.

In one aspect, the invention provides a base station configured to operate as part of a dual connectivity configuration in which a communication bearer between a core network and a user communication device is provided via the base station and a further base station, said base station comprising: means for establishing said communication bearer with said user communication device via a communication link over a base station to base station interface between said base station and said further base station, wherein said communication bearer comprises: a first part, in one of said base station and said further base station, where first processing is performed; and a second part, in the other of said base station and said further base station, where second processing is performed; and means for obtaining: i) first time information representing a time when said first processing started, in said one of said base station and said further base station, for a data packet communicated using said communication bearer; and ii) second time information representing a time when at least part of said data packet communicated using said communication bearer was acknowledged, in said other of said base station and said further base station, by said mobile communication device; and means for determining a packet delay based on said obtained first time information and second time information.

In one aspect, the invention provides a master base station configured to operate as part of a dual connectivity configuration in which a communication bearer between a core network and a user communication device is provided via the master base station and a secondary base station, said base station comprising: means for establishing said communication bearer with said user communication device via a communication link over a base station to base station interface between said master base station and said secondary base station, wherein said communication bearer comprises: a first (e.g. PDCP) part, on said master base station, where first (e.g. PDCP) processing is performed; a second (e.g. MAC) part, on said master base station, where second (e.g. MAC) processing is performed; and a further (e.g. MAC) part, on said secondary base station, where further (e.g. MAC) processing is performed. The master base station comprises means for obtaining: i) first time information representing a time when said first processing started for a data packet, in said master base station, communicated using said communication bearer; and ii) second time information representing a time when at least part of said data packet communicated using said communication bearer was acknowledged, in said master base station, by said mobile communication device; and means for determining a packet delay for communication via both the second part and the further part based on said obtained first time information and second time information.

In one aspect, the invention provides a master base station configured to operate as part of a dual connectivity configuration in which a plurality of communication bearers are provided between a core network and a user communication device, said base station comprising: means for establishing: a first communication bearer, with said user communication device, via a communication link over a base station to base station interface between said master base station and a secondary base station; and a second communication bearer, with said user communication device, that is not via a communication link over a base station to base station interface between said master base station and said secondary base station; means for identifying whether a data packet is communicated via said first communication bearer or via said second communication bearer; means for obtaining, when a data packet is identified by said identifying means to be communicated via said second communication bearer: i) first time information representing a time when processing started for said data packet communicated via said second communication bearer; and ii) second time information representing a time when at least part of said data packet communicated via said second communication bearer was acknowledged, in said master base station, by said mobile communication device; and means for determining, when a data packet is identified by said identifying means to be communicated via said second communication bearer, a packet delay for said data packet based on said obtained first time information and second time information; wherein said determining means is operable, when a data packet is identified by said identifying means to be communicated via said first communication bearer, to disregard said data packet communicated via said first communication bearer without determining a packet delay for said data packet communicated via said first communication bearer.

In one aspect, the invention provides a system comprising the above described base station apparatus and a user communication device.

The invention provides, for all methods disclosed, corresponding computer programs or computer program products for execution on corresponding equipment, the equipment itself (user equipment, nodes or components thereof) and methods of updating the equipment.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described, by way of example only, with reference to the attached figures in which.

MODES FOR CARRYING OUT THE INVENTION

Overview

Figure 1:
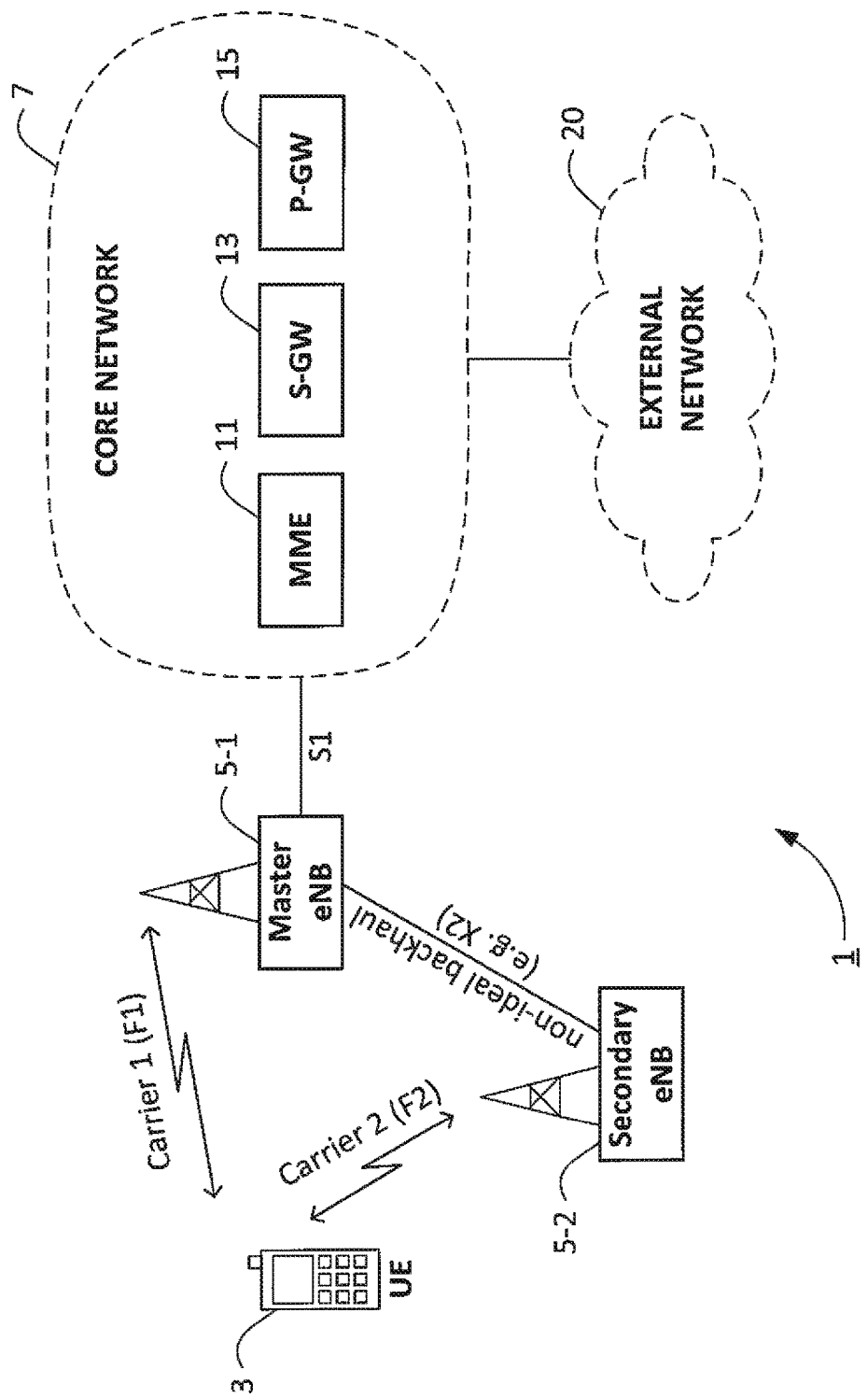
FIG. 1 schematically illustrates a mobile telecommunication system of a type to which the invention is applicable.

FIG. 1 schematically illustrates a mobile (cellular) telecommunication system 1 including a mobile telephone 3 (or other compatible user equipment) served via the base stations 5-1 and 5-2. As those skilled in the art will appreciate, whilst one mobile telephone 3 and two base stations 5 are shown in FIG. 1 for illustration purposes, the system, when implemented, will typically include other base stations and mobile telephones.

A user of the mobile telephone 3 can communicate with other users and/or remote servers via the base stations 5 and the core network 7. The core network 7 comprises, amongst other things, a mobility management entity (MME) 11, a serving gateway (S-GW) 13 and a Packet Data Network (PDN) Gateway (P-GW) 15.

The MME 11 manages general mobility aspects of the mobile telephone 3 and ensures that connectivity is maintained with the mobile telephone 3 as it is moving within the geographical area covered by the communication system (and/or as the mobile telephone 3 is handed over between base stations of the communication system). The MME 11 also handles control-plane signalling for the mobile telephone 3 and manages the various bearers associated with the mobile telephone 3 (e.g. such as an Evolved Packet System (EPS) bearer and/or a radio bearer) e.g. by controlling the S-GW 13 and the P-GW 15 (and/or possibly other network nodes) via which such bearers are provided.

The S-GW 13 provides a connection between the mobile telephone 3 and the core network 7 (via the base station 5-1) for sending and receiving user plane data over an associated communication bearer (e.g. an EPS bearer). The communication bearer normally terminates at the P-GW 15, although it is often complemented by an external bearer as well (for example, another EPS bearer and/or the like) between the P-GW 15 and a communication end-point outside the core network 7. It will be appreciated that, whilst shown as separate entities, the functionalities of the S-GW 13 and the P-GW 15 could be implemented in a single gateway element.

As will be understood by those skilled in the art, each base station 5 operates one or more base station cells (not shown) in which communications can be made between the base station 5 and the mobile telephone 3 using one or more suitable communication links (e.g. radio links) provided between the mobile telephone 3 and the respective serving base station 5. Each of said communication links may be carried over one or more associated carriers (F1, F2).

In this system, a dual connectivity service can be provided to compatible user equipment (such as the mobile telephone 3) using an appropriately configured communication bearer or bearers (e.g. as specified in 3GPP TR 36.842). Therefore, one of the base stations is configured as a master base station (MeNB) 5-1 and the other base station is configured as a secondary base station (SeNB) 5-2. The base stations 5 are connected to each other via an appropriate communication interface (e.g. an 'X2' interface).

The MeNB 5-1 is connected to the core network 7 via an S1 interface in order to provide both user-plane ('S1-U') communication via the S-GW 13 and control-plane ('S1-MME') communication with the MME 11. Backhaul communication for the SeNB 5-2 is routed via a non-ideal backhaul comprising the interface between the base stations 5. Although not shown in FIG. 1, the SeNB 5-2 may also have user-plane ('S1-U') connectivity with the core network 7 (other than via the MeNB 5-1) for at least some of its communication bearers (e.g. any SeNB-specific bearers and/or regular bearers), either directly or via the external network 20.

The mobile telephone 3 may be configured with multiple communication bearers (for example, a first communication bearer for voice, a second communication bearer for video, a third communication bearer for internet data, etc.), e.g. in order to provide different transmission priorities for different services. Each communication bearer (and each data packet sent over the communication bearers) is associated with an appropriate QoS identifier, such as a QCI value, in order ensure that the appropriate transmission priorities can be met regardless whether such communication bearers are provided via the MeNB 5-1, the SeNB 5-2, or both. Data associated with one of the mobile telephone's 3 communication bearers may be transmitted on the same radio link/carrier (although data for different bearers may be transmitted over different radio links/carriers).

In this system, the base stations 5-1, 5-2 (and the mobile telephone 3) are configured to provide dual connectivity using a split bearer, i.e. a communication bearer served via both the MeNB 5-1 and the SeNB 5-2 for communicating user-plane data for the mobile telephone 3. The setting up of such a split bearer may be initiated by the MeNB 5-1, when appropriate. As part of this dual connectivity service, in this example, PDCP functionality for the split bearer is provided by the MeNB 5-1 and MAC functionality for the split bearer is provided by the SeNB 5-2 (or both the MeNB 5-1 and the SeNB 5-2). Thus, when a downlink data packet is received by the MeNB 5-1 (from the core network 7), the MeNB 5-1 performs the appropriate PDCP processing of the data packet and the MeNB 5-1 passes the data packet to both the MeNB's 5-1 lower layers and to the SeNB 5-2 (over the X2 interface provided between them). The SeNB 5-2 receives the data packet from the MeNB 5-1, without involving the PDCP layer (if any) of the SeNB 5-2, and passes the data packet to the RLC layer, from where it is subsequently passed to the MAC layer of the SeNB 5-2. Finally, the data packet is transmitted to the mobile telephone 3 using the PHY layer. Accordingly, whilst each data packet is processed by the appropriate base station layers (the PDCP, RLC, MAC, and PHY layers), in this split bearer scenario different layers are provided by different base stations 5-1, 5-2.

Advantageously, the base stations 5-1, 5-2 are also configured to perform packet delay measurements for the split bearer(s). A number of examples are disclosed herein as to how this can be achieved in a particularly efficient and effective manner.

In one example, the SeNB 5-2 is configured to provide to the MeNB 5-1 (via the X2 interface) information identifying the time (e.g. a MAC time stamp) associated with the reception of a particular data packet by the mobile telephone 3. Using the SeNB's 5-2 MAC 'receipt' time stamp information and the 'arrival' time stamp information corresponding to that packet (provided by the MeNB's 5-1 PDCP layer), or by averaging the respective delays associated with a plurality of data packets based on their respective time stamp pairs, the MeNB 5-1 can work out the delay resulting from communicating a data packet using the split bearer.

In a slight modification to the above example, instead of the SeNB 5-2 providing a MAC time stamp for the data packet received by the mobile telephone 3, the MeNB 5-1 is configured to include its own associated PDCP arrival time stamp with each data packet it forwards to the SeNB 5-2. In this case, therefore, the SeNB 5-2 is able to work out the delay resulting from communicating a data packet using the split bearer, based on the MeNB's 5-1 PDCP time stamp information and the SeNB's 5-2 own MAC time stamp information associated with that particular data packet (or by averaging the respective delays associated with a plurality of data packets).

In another example, the SeNB 5-2 may be configured to work out the packet delay for the split bearer even without receiving an associated PDCP time stamp from the MeNB 5-1. Specifically, the SeNB 5-2 may be configured to substitute, for the time stamp of the PDCP layer, a time stamp generated by its own RLC layer (e.g. indicating a time the data packet was received at the RLC upper service access point (SAP)). Beneficially, this modified calculation would result in a more accurate representation of the delay resulting from the processing of data packets by the SeNB 5-2, since this calculation excludes any additional delay introduced by the X2 interface and/or any delay introduced by the master base station 5-1. It will be appreciated that the SeNB 5-2 may be configured to report (over the X2 interface) the result of this modified calculation to the MeNB 5-1, if appropriate.

In yet another example, the base stations 5-1, 5-2 are each configured to provide a different respective part of a 'composite' packet delay value, which comprises:
  i) one part, derived by the MeNB 5-1, comprising an MeNB 5-1 specific 'internal' packet delay measured between receipt of a data packet by the MeNB's 5-1 PDCP layer from the core network 7 (e.g. at the PDCP upper SAP) and successful transmission of that data packet over the X2 interface (e.g. based on an acknowledgement received from the SeNB 5-2 for that data packet at the X2 SAP of the MeNB 5-1); and
  ii) one part, derived by the SeNB 5-2, comprising an SeNB 5-2 specific 'internal' packet delay measured between receipt of a data packet over the X2 interface (e.g. at the RLC upper SAP of the SeNB 5-2) and a time stamp provided by the MAC layer of the SeNB 5-2, of a corresponding acknowledgement from the mobile telephone 3 of the successful receipt of that data packet by the mobile telephone 3.

The composite delay value may thus be derived, by one of the two base stations 5, from the two parts (with the base station doing the derivation being provided with the part of the delay value derived by the other base station over, for example, the X2 interface). The composite delay value may be derived by another communication entity (e.g. an OAM entity) to which each part of the composite delay value is provided by the respective base station 5 that derived that part (or with both parts being provided by a single base station that has received one of the two parts from the other base station e.g. over the X2 interface).

In other words, the MeNB 5-1 is configured to measure (at the PDCP upper SAP) the time when it is sending a data packet on the downlink towards the mobile telephone 3, and to obtain the timing of an associated acknowledgement received at the X2 SAP. Thus it will be appreciated that the MeNB's 5-1 part of the measurement may take into account any X2 specific delay. The SeNB 5-2 may be configured to perform its own part of the packet delay measurement (as described above), and to provide the result of its measurement to the MeNB 5-1, over the X2 interface. In this case, the MeNB 5-1 can combine the two parts of the measurement. The MeNB 5-1 may also be configured to provide the combined measurement (or the two parts) to a further entity, e.g. an OAM entity.

It will be appreciated that the composite value may comprise another part such as an X2 specific delay measured between sending a data packet by the MeNB 5-1 over the X2 interface and receipt of that data packet by the SeNB 5-2 (e.g. based on a time when the MeNB's X2 SAP sends that data packet and when it receives the corresponding X2 acknowledgement from the SeNB's 5-2). In this case, the MeNB 5-1 specific part may be calculated between the time of receipt of a data packet at the PDCP upper SAP (from the core network 7) and the time when the MeNB's X2 SAP sends that data packet towards the SeNB 5-2.

Thus, based on the appropriate time stamp pair(s) obtained from the PDCP layer and the MAC layer, the base stations 5 are able to derive an appropriate packet delay value (e.g. by performing the calculations specified in TS 36.314) even when dual connectivity using a split bearer is in place for the mobile telephone 3.

This in turn may also be beneficial to improving the overall system efficiency, as more extensive and more accurate L2 measurements can be performed by the base stations, based on which measurements the base stations may be able to update their operation. Finally, if appropriate, such packet delay measurements may be made available to other entities, e.g. an OAM entity, in order to assist the network operator updating the network configuration.

Mobile Telephone

Figure 2:
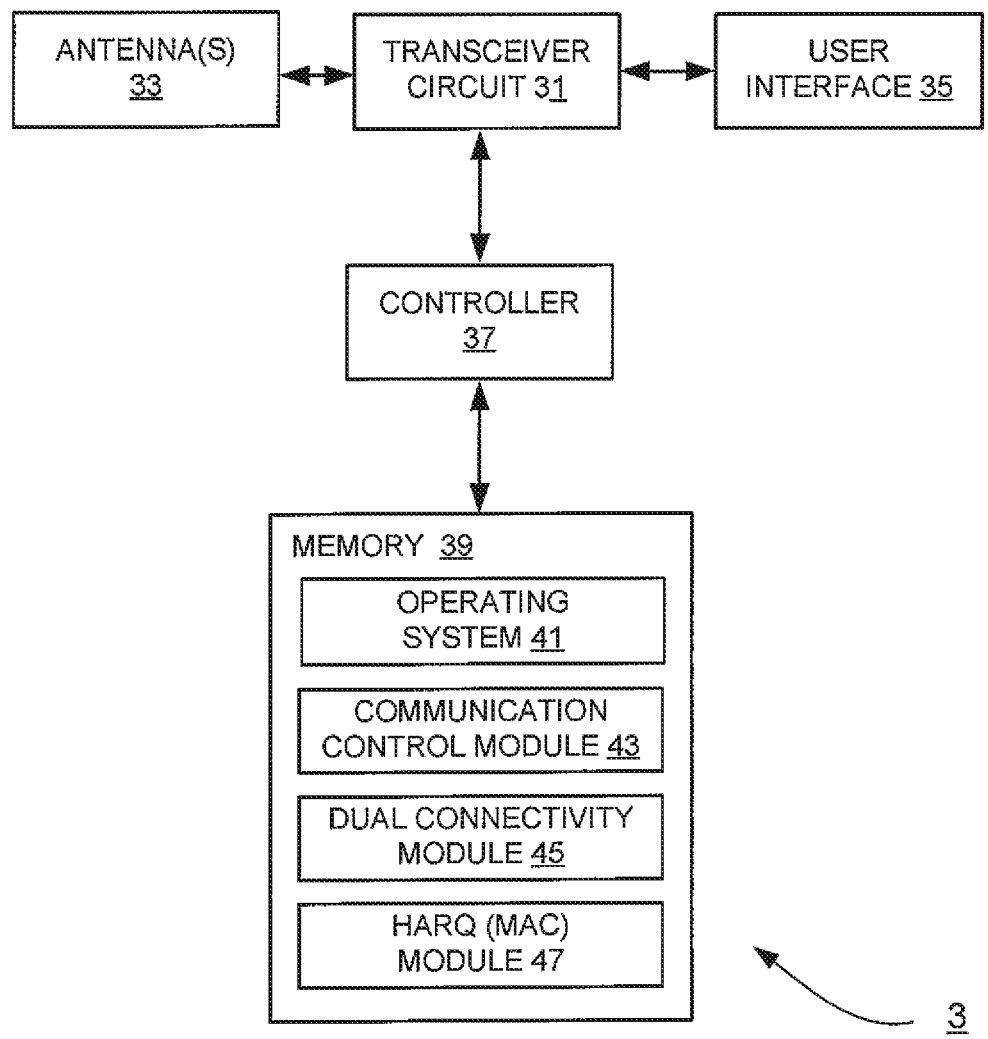
FIG. 2 is a block diagram illustrating the main components of the mobile telephone forming part of the system shown in FIG. 1.

FIG. 2 is a block diagram illustrating the main components of the mobile telephone 3 shown in FIG. 1. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 2, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communications control module 43, a dual connectivity module 45, and a HARQ module 47.

The communications control module 43 controls communications between the mobile telephone 3 and the base station(s) 5. The communications control module 43 also controls the separate flows of uplink data and downlink data and control data to be transmitted to the base station 5 (and other nodes, e.g. the MME 11, via the base station 5).

The dual connectivity module 45 coordinates (with assistance by the communications control module 43) communications over the respective communication bearer(s) forming part of a dual connectivity service. The dual connectivity module 45 also controls communications with the MeNB 5-1 over the associated carrier F1 and communications with the SeNB 5-2 over the associated carrier F2.

The HARQ module 47 (which operates on the MAC layer) is responsible for generating and sending acknowledgements for each data packet successfully received from the base station(s) serving the mobile telephone 3 (or sending a negative acknowledgement in case of a failure in receiving a data packet). The acknowledgement (Ack) sent by the HARQ module 47 includes information identifying the point in time (e.g. by identifying a particular resource block or a set of resource blocks of a radio frame) when a particular data packet was received.

Master Base Station

Figure 3:
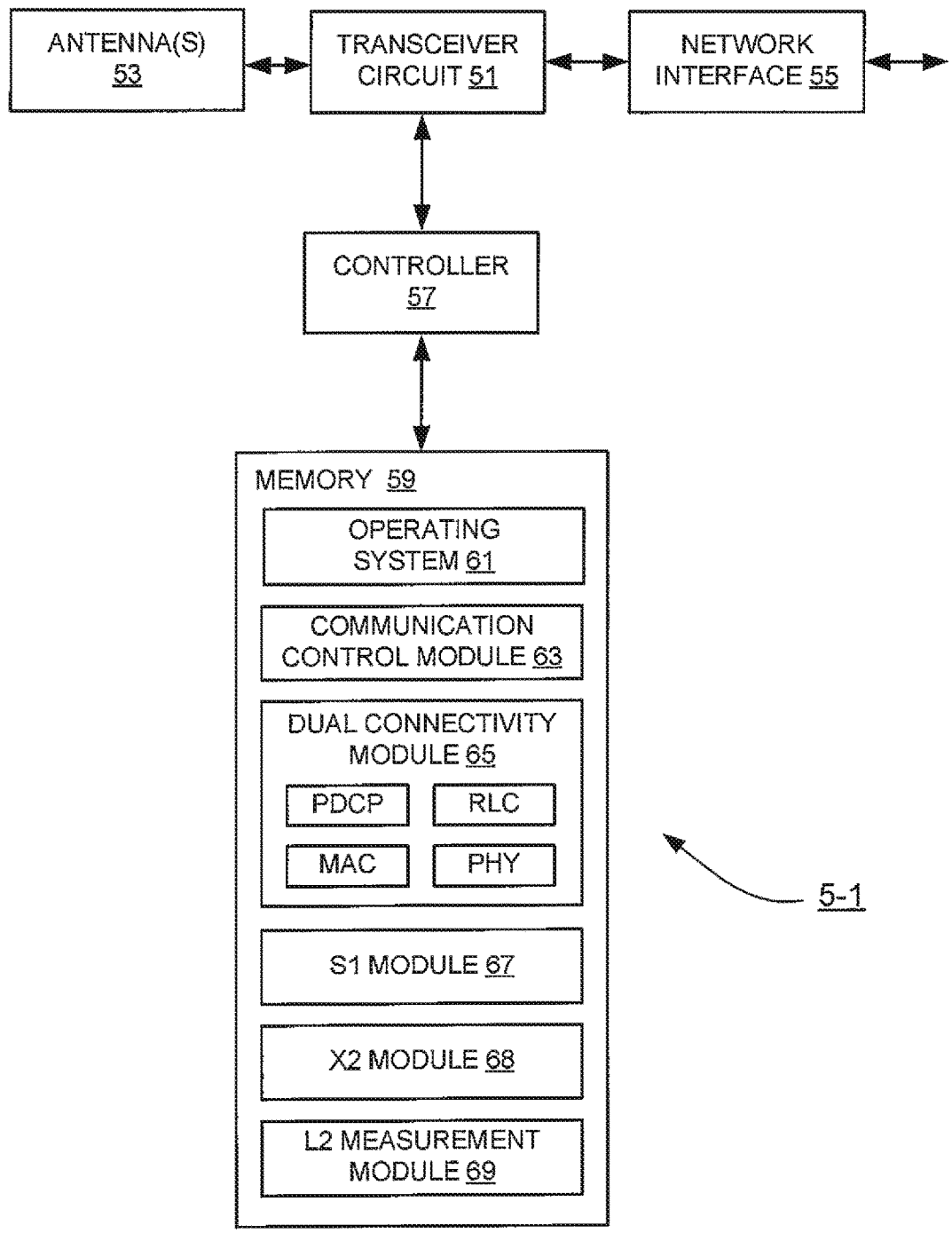
FIG. 3 is a block diagram illustrating the main components of the master base station forming part of the system shown in FIG. 1.

FIG. 3 is a block diagram illustrating the main components of the master base station 5-1 shown in FIG. 1. The master base station 5-1 is a communications node providing services to user equipment 3 within its coverage area. In the embodiments according to the invention, communications between the various base stations 5 and the mobile telephone 3 are coordinated. As shown, the master base station 5-1 includes a transceiver circuit 51 which transmits signals to, and receives signals from, the mobile telephone 3 via at least one antenna 53. The master base station 5-1 also transmits signals to and receives signals from the core network 7 and other neighbouring base stations (e.g. the SeNB 5-2) via a network interface 55 (X2/non-ideal backhaul interface for communicating with neighbouring base stations and S1 interface for communicating with the core network 7). The operation of the transceiver circuit 51 is controlled by a controller 57 in accordance with software stored in memory 59. The software includes, among other things, an operating system 61, a communications control module 63, a dual connectivity module 65, an S1 module 67, an X2 module 68, and a layer 2 (L2) measurement module 69.

The communications control module 63 controls communications between the master base station 5-1 and the SeNB 5-2, the mobile telephone 3, and the core network devices.

The dual connectivity module 65 coordinates communications over the communication bearer (or bearers) forming part of a dual connectivity service for the mobile telephone 3 served by this base station.

The dual connectivity module 65 includes the PDCP, RLC, MAC, and PHY entities (layers) responsible for communicating data packets via the base station 5-1 when it is configured as an MeNB.

The PDCP entity is responsible for receiving (downlink) data packets from upper layers and for logging the point in time, for each received data packet, when a particular data packet (for the mobile telephone 3) arrives at the upper SAP of the PDCP entity, i.e. the point in time when the PDCP entity begins handling that data packet. The PDCP entity provides information identifying the logged point(s) in time to the L2 measurement module 69 of the MeNB 5-1 and/or the L2 measurement module 69 of the SeNB 5-2 (via the X2 module 68), as appropriate.

The MAC entity is responsible for obtaining (and logging) acknowledgements for each data packet successfully received by the mobile telephone 3 transmitted via the master base station 5-1 (or obtaining a negative acknowledgement in case of a failure in receiving a data packet). The mobile telephone's 3 acknowledgement (Ack) includes information identifying the point in time (e.g. by identifying a particular resource block or a set of resource blocks of a radio frame) when a particular data packet was received by the mobile telephone 3. The MAC entity provides information identifying the logged point(s) in time to the L2 measurement module 69 of the MeNB 5-1.

The S1 module 67 handles S1 signalling (e.g. generates, sends, and receives messages/PDUs formatted in accordance with the S1 protocol) between the base station 5 and the core network 7 entities (such as the MME 11 and the S-GW 13). For example, the S1 module 67 is responsible for receiving downlink data packets from the core network 7 and passing the received data packets to the dual connectivity module 65 (via the PDCP upper SAP thereof), when the base station 5-1 is configured to operate as an MeNB.

The X2 module 68 handles X2 signalling (e.g. generates, sends, and receives messages/PDUs formatted in accordance with the X2 application protocol) between the master base station 5 and other base stations, such as the secondary base station 5-2. For example, the X2 module 68 is responsible for exchanging, with the corresponding X2 module of the secondary base station 5-2, signalling (e.g. control signalling and/or data packets) relating to the split bearer.

The L2 measurement module 69 is responsible for deriving a packet delay value (e.g. an average packet delay value per QoS class) for the data packets transmitted to user equipment (such as the mobile telephone 3) connected to this base station (either directly, or indirectly, via another base station as part of a dual connectivity service). In order to do so, the L2 measurement module 69 obtains information identifying the logged point in time when a particular (downlink) data packet was received by the PDCP entity (at the upper SAP thereof) from upper layers. The L2 measurement module 69 also obtains (e.g. via the X2 module 68) information identifying the logged point in time when that particular data packet was received by the mobile telephone 3 (based on information identifying an appropriate point in time when a corresponding acknowledgement was received by the lower SAP of the MAC entity communicating with the mobile telephone 3).

Secondary Base Station

Figure 4:
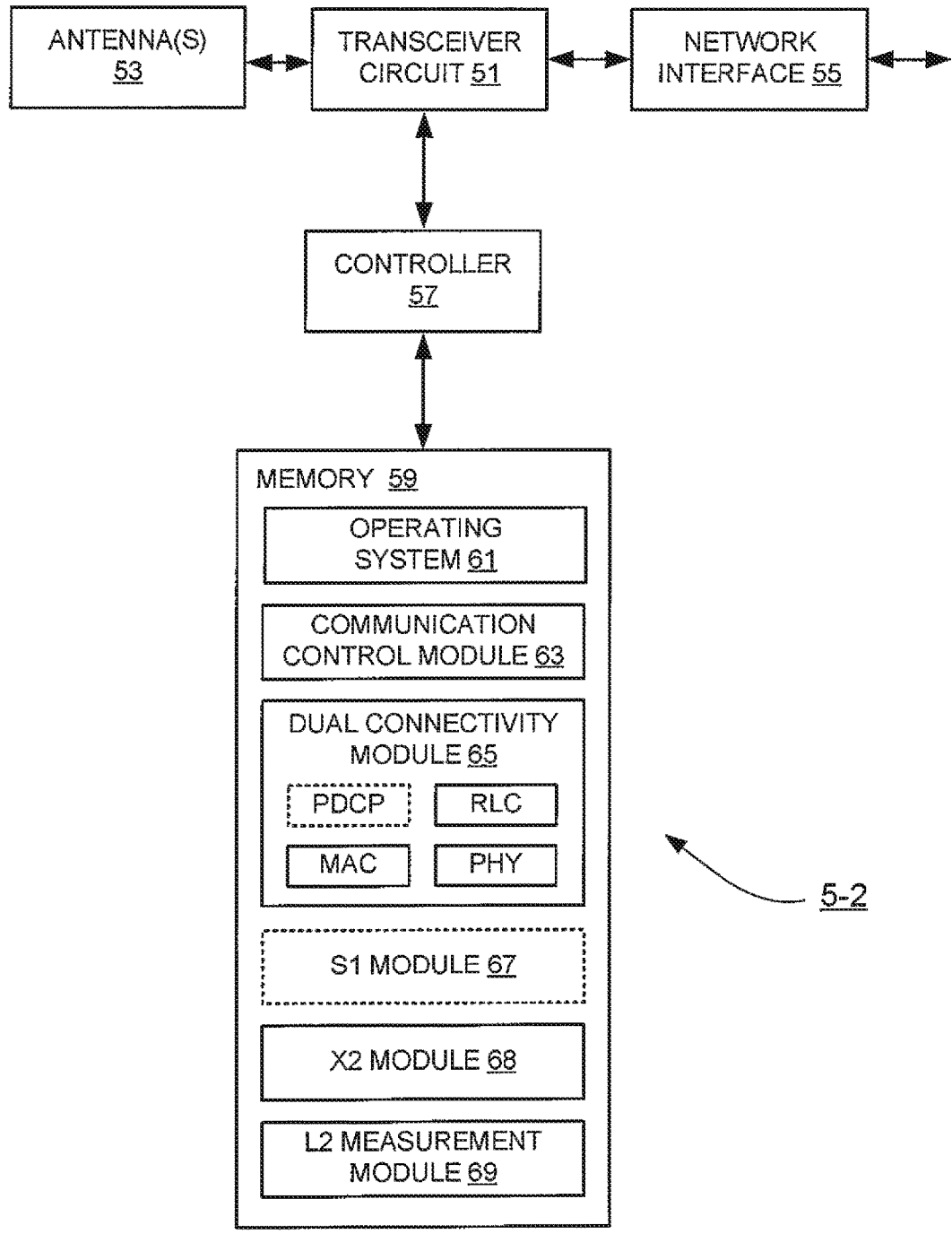
FIG. 4 is a block diagram illustrating the main components of the secondary base station forming part of the system shown in FIG. 1.

FIG. 4 is a block diagram illustrating the main components of the secondary base station 5-2 shown in FIG. 1. The secondary base station 5-2 is a communications node providing services to user equipment 3 within its coverage area.

As shown, the secondary base station 5-2 includes a transceiver circuit 51 which transmits signals to, and receives signals from, the mobile telephone 3 via at least one antenna 53. The secondary base station 5-2 also transmits signals to and receives signals from the core network 7 and other neighbouring base stations (e.g. the MeNB 5-1) via a network interface 55 (X2/non-ideal backhaul interface for communicating with neighbouring base stations and an optional S1 interface for communicating with the core network 7). The operation of the transceiver circuit 51 is controlled by a controller 57 in accordance with software stored in memory 59. The software includes, among other things, an operating system 61, a communications control module 63, a dual connectivity module 65, an (optional) S1 module 67, an X2 module 68, and a layer 2 (L1) measurement module 69.

The communications control module 63 controls communications between the secondary base station 5-2 and the MeNB 5-1, the mobile telephone 3, and the core network devices.

The dual connectivity module 65 coordinates communications over the communication bearer (or bearers) forming part of a dual connectivity service for the mobile telephone 3 served by this base station.

The dual connectivity module 65 includes the PDCP, RLC, MAC, and PHY entities (layers) responsible for communicating data packets via the base station 5-2 when it is configured as an SeNB. However, as can be seen in FIG. 4, in case of a split bearer, only the RLC, MAC, and PHY entities are being used by the secondary base station 5-2 (although the PDCP entity may still be used for other, non-split bearers of the secondary base station 5-2).

The MAC entity is responsible for obtaining (and logging) acknowledgements for each data packet successfully received by the mobile telephone 3 transmitted via the secondary base station 5-2 (or obtaining a negative acknowledgement in case of a failure in receiving a data packet). The mobile telephone's 3 acknowledgement (Ack) includes information identifying the point in time (e.g. by identifying a particular resource block or a set of resource blocks of a radio frame) when a particular data packet was received by the mobile telephone 3. The MAC entity provides information identifying the logged point(s) in time to the L2 measurement module 69 of the SeNB 5-2 and/or the L2 measurement module 69 of the MeNB 5-1 (via the X2 module 68), as appropriate.

If present, the S1 module 67 handles S1 signalling (e.g. generates, sends, and receives messages/PDUs formatted in accordance with the S1 protocol) between the base station 5 and the core network 7 entities (such as the MME 11 and the S-GW 13).

The X2 module 68 handles X2 signalling (e.g. generates, sends, and receives messages/PDUs formatted in accordance with the X2 application protocol) between the secondary base station 5-2 and other base stations, such as the master base station 5-1. For example, the X2 module 68 is responsible for exchanging, with the corresponding X2 module of the master base station 5-1, signalling (e.g. control signalling and/or data packets) relating to the split bearer.

The L2 measurement module 69 is responsible for deriving a packet delay value (e.g. an average packet delay value per QoS class) for the data packets transmitted to user equipment (such as the mobile telephone 3) connected to this base station (either directly, or indirectly, via another base station as part of a dual connectivity service). In order to do so, the L2 measurement module 69 obtains (e.g. via the X2 module 68) information identifying the logged point in time when a particular (downlink) data packet was received from upper layers by the PDCP entity (at the PDCP upper SAP) of the MeNB 5-1 and/or information identifying a point in time when a particular data packet was received by the SeNB 5-2 from the PDCP entity of the MeNB 5-1 (e.g. when a particular data packet was received by the X2 module 68 or when a particular data packet was received at the upper SAP of the RLC entity). The L2 measurement module 69 also obtains information identifying the logged point in time when that particular data packet was received by the mobile telephone 3 (based on information identifying an appropriate point in time when a corresponding acknowledgement was received by the lower SAP of the MAC entity).

In the above description, the mobile telephone 3 and the base stations 5 are described for ease of understanding as having a number of discrete modules (such as the communications control modules and the dual connectivity modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Packet Delay

Before discussing the detailed embodiments, a definition of packet delay measurement is given, in accordance with section 4.1.4.1 of TS 36.314, the contents of which are summarised below. TS 36.314 discloses that the objective of this measurement is to measure L2 Packet Delay for Operation and Maintenance (OAM) performance observability. If there is at least one relay node served in a cell, for that cell the base station performs each measurement separately for packets transmitted between the base station and UEs and for packets transmitted between the base station and each relay node.

In LTE systems, due to its complex functions, the Layer 2 is divided into further layers, such as the MAC layer, the PDCP layer, and the RLC layer. The packet delay measurement concerns the operation of the MAC, RLC, and PDCP layers.

The PDCP layer is responsible mainly for Internet Protocol (IP) header compression and ciphering, and also supports lossless mobility in case of handovers and provides integrity protection to higher layer control protocols. The RLC layer comprises mainly Automatic Retransmission Request (ARQ) functionality and supports data segmentation and concatenation. The MAC Layer is the lowest part, close to the PHY layer (Layer 1), and is responsible for controlling access to the physical medium (i.e. the air interface). Thus, any data packet received by the PDCP layer from higher layers is adapted (segmented, re-arranged, re-ordered, prioritised etc.) by the RLC and MAC layers for transmission over the PHY layer. Accordingly, a PDCP service data unit (SDU) comprising the data packet received by the PDCP entity must be received in full by the mobile telephone 3 before the mobile telephone is able to re-assemble and verify that data packet. Thus, a data packet is not considered to have been received by the mobile telephone 3 until receipt of the last transmitted part of that data packet has been confirmed by the mobile telephone 3. It will be appreciated that since the parts may be transmitted out of order and/or combined with other data packets, the last part of a data packet may not necessarily comprise the actual end portion of that data packet.

The term 'Packet Delay in the DL per QCI' as used in TS36.314 refers to an average value of delay in communicating data packets using data radio bearers (DRBs) via a particular base station 5, which value is normally obtained per Quality of Service (QoS) class. The appropriate QoS class of a particular data packet can be identified by a QoS Class Identifier (QCI) associated with each data packet.

For arrival of a particular data packet (associated with a DRB) the reference point is the so-called PDCP upper Service Access Point (SAP), i.e. the point at which services of the PDCP layer can be accessed by the upper layers of the base station 5. In other words, the PDCP SAP can be considered to represent the point at which the responsibility for delivering a downlink data packet is assumed by the PDCP layer. For successful reception of a particular data packet by the UE 3 the reference point is the so-called MAC lower SAP of the base station 5 serving that UE 3. In other words, receipt of the last transmitted part of a data packet is normally considered to be the point in time when an 'Ack' corresponding to that part is received from the PHY layer by the MAC lower SAP.

In more details, the packet delay measurement, M(T,qci), can be derived using the following equation:

$$M(T, qci) = \left\lfloor \frac{\sum_{\forall i} tAck(i) - tArriv(i)}{I(T)} \right\rfloor$$

wherein $\lfloor \; \rfloor$ is a flooring function, and wherein a definition of the parameters is given in Table 1.

TABLE 1 parameters for calculating Packet Delay (Table 4.1.4.1-1 of TS 36.314)

| parameter | Definition |
|---|---|
| M(T, qci) | Packet Delay in the DL per QCI, averaged during time period T. Unit: Integer ms. |
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i during time period T. |
| T | Time Period during which the measurement is performed |

Packet delay measurement is intended for measuring, amongst other delays, any delay introduced by buffering at the base station 5. Accordingly, a high packet delay may be indicative of transmission issues (e.g. problems affecting the air interface), overload of the base station 5, and/or the like. In dual connectivity mode, it is therefore important to measure the packet delay for dual connectivity bearers.

Operation—First Embodiment

A number of different examples will now be described that illustrate how the invention can be put into effect using the mobile telephone 3 and the base stations 5 (as exemplary dual connectivity network points) of FIG. 1. As discussed above, dual connectivity service can be provided by configuring the mobile telephone 3 to communicate with both the MeNB 5-1 and at least one SeNB 5-2, using respective communication bearers.

Figure 5:
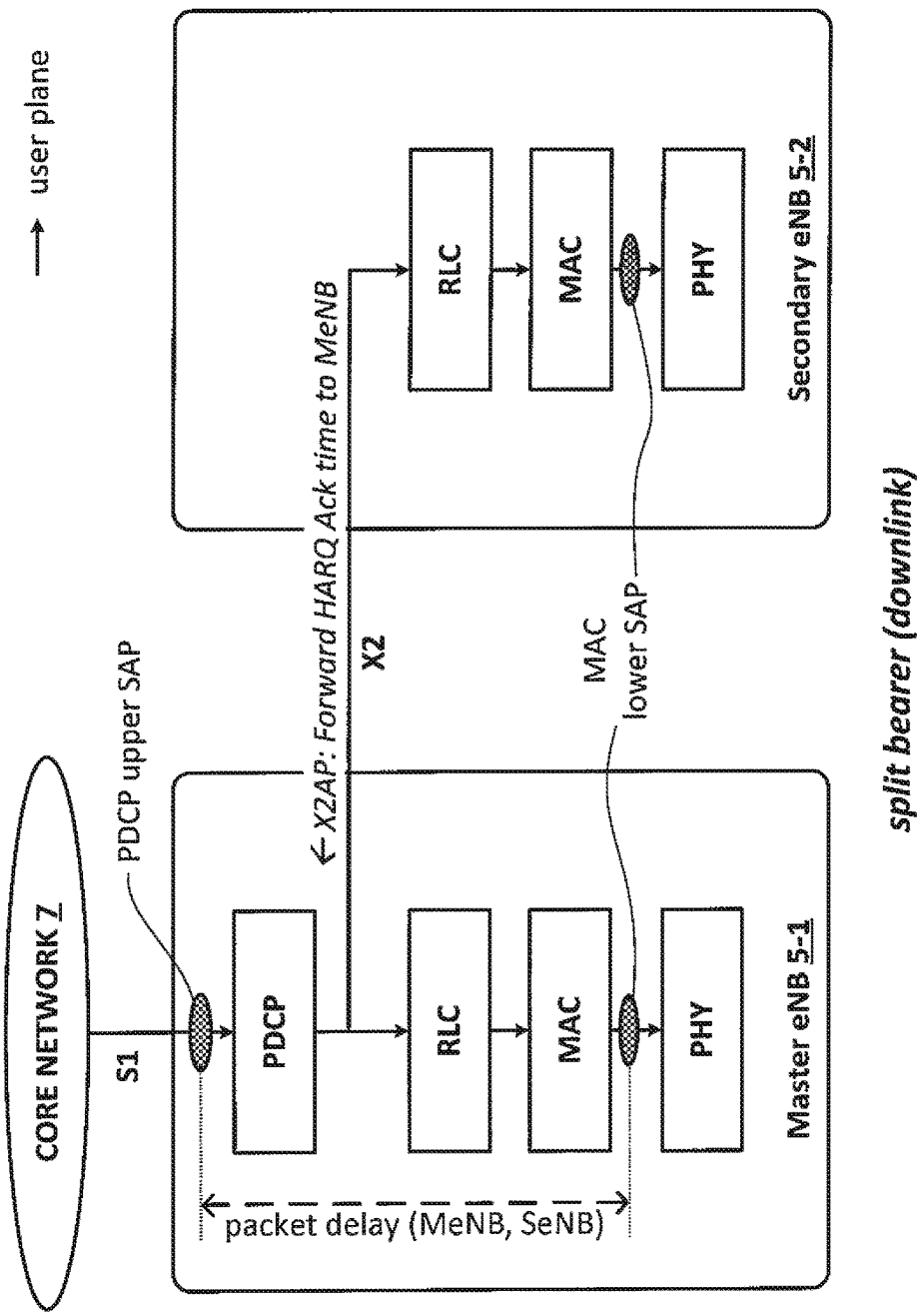
FIGS. 5 to 8 illustrate exemplary ways in which packet delay can be derived in the system shown in FIG. 1 when a bearer split configuration is in place.

FIG. 5 illustrates an exemplary bearer split configuration according to an embodiment of the present invention. In FIG. 5, some of the protocol layers implemented by the base stations 5 are omitted for the sake of simplicity. Whilst FIG. 5 illustrates the downlink direction only (as indicated by the arrows), a similar bearer split configuration may be realised for the uplink direction as well, e.g. by reversing the direction of data transmissions, where appropriate.

As can be seen, the S1 control-plane (e.g. 'S1-MME') for the mobile telephone 3 terminates at the MeNB 5-1. Control-plane signalling for the mobile telephone 3 can be exchanged with the SeNB 5-2 via the base station to base station interface (denoted 'X2' in FIG. 5), when required, or it can be communicated directly between the MeNB 5-1 and the mobile telephone 3.

In a conventional or 'regular' communication bearer configuration that may be used in a both single and dual connectivity scenarios, the MeNB 5-1 handles the S1 user-plane for a communication bearer (e.g. a communication bearer that is associated with carrier F1 of FIG. 1) associated with the mobile telephone 3. Downlink data packets for the mobile telephone 3 are received by the MeNB 5-1 at the PDCP upper SAP, when an associated time value (e.g. 'tArriv(i)') is logged (by the PDCP entity) for each packet. In this case, as indicated by the dashed arrows between the PDCP, RLC, MAC, and PHY layers of the MeNB 5-1, (downlink) user data from the core network 7 is processed within the base station 5-1, and transmitted over the air interface (using carrier F1) between the base station 5-1 and the mobile telephone 3 (not shown in FIG. 5) using the services of the PHY layer. Successful receipt of such user data packets is confirmed by the mobile telephone 3 by sending an appropriate acknowledgement to the MAC entity of the MeNB 5-1, which acknowledgement is received at the MAC lower SAP, as indicated between the PHY and MAC layers of the MeNB 5-1. A time value associated with the mobile telephone's 3 acknowledgement (e.g. 'tAck(i)') is logged (by the MAC entity) for each successfully transmitted data packet.

According to the communication bearer configuration of the split type that may be used in a dual connectivity scenario, a communication bearer (e.g. a communication bearer that is associated with carrier F2 of FIG. 1) may be provided for the mobile telephone 3 via the SeNB 5-2 but also involving the MeNB 5-1. In such indirect case, a bearer split may be realised by connecting the PDCP layer of the MeNB 5-1 to the RLC layer of the SeNB 5-2, via the X2 interface.

In this exemplary architecture, downlink data packets can be sent from a remote endpoint over an associated communication bearer through the core network 7 (e.g. via the S-GW 13) and received at the PDCP upper SAP for processing by the PDCP layer of the MeNB 5-1. The PDCP entity logs an associated time value (e.g. 'tArriv(i)') for each data packet, when it begins to process that data packet. After PDCP processing, the data packets are passed to the RLC layer of the other base station 5-2 (over the X2 interface), then to the MAC layer, before they are transmitted to the mobile telephone 3 (not shown in FIG. 5) over the PHY layer. Successful receipt of such data packets is confirmed by the mobile telephone 3 by sending an appropriate acknowledgement to the MAC entity of the SeNB 5-2, which acknowledgement is received at the MAC lower SAP, as indicated between the PHY and MAC layers of the SeNB 5-2. A time value associated with the mobile telephone's 3 acknowledgement (e.g. 'tAck(i)') is logged (by the MAC entity of the SeNB 5-2) for each successfully transmitted data packet.

It will be appreciated that the RLC, MAC, and PHY layers of the MeNB 5-1 operate substantially identically to the respective layers of the SeNB 5-2, thus their description is omitted herein for simplicity.

In this example, the SeNB 5-2 is configured to forward (using its dual connectivity module 65 and X2 module 68), to the MeNB 5-1, information identifying the time tAck(i) when HARQ acknowledgement was received for the last part of a data packet to be used in the calculation of packet delay by the L2 measurement module 69 of the MeNB 5-1. The SeNB 5-2 may be configured to forward the HARQ acknowledgement time tAck(i) for each data packet or only for selected data packets, e.g. a number (one or more) of consecutive data packets identified by the MeNB 5-1.

For example, the SeNB 5-2 may be configured to log (using its dual connectivity module 65) the information identifying the time of HARQ acknowledgements for all packets sent via the SeNB 5-2, and to provide the logged information (over the X2 interface) to the MeNB 5-1 upon request and/or periodically.

Advantageously, the MeNB 5-1 (using its L2 measurement module 69) is able to derive the appropriate packet delay (e.g. using the above equation) based on information obtained from the PDCP entity and information obtained from the MAC entity of the SeNB 5-2 (and possibly from the MAC entity of the MeNB 5-1).

Operation—Second Embodiment

Figure 6:
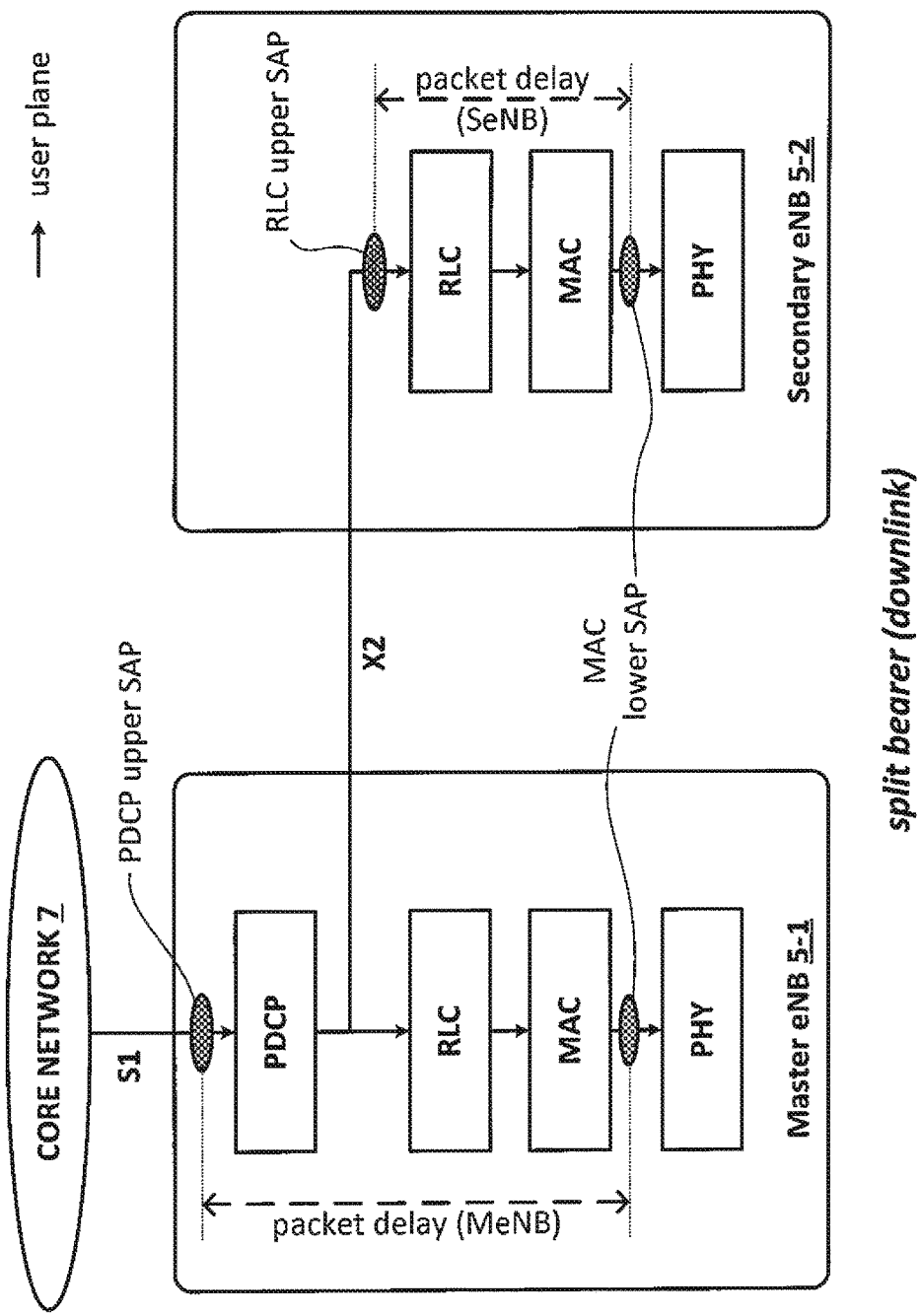

FIG. 6 illustrates an exemplary bearer split configuration according to an embodiment of the present invention. In FIG. 6, the protocol layers correspond to the protocol layers described with reference to FIG. 5, thus their description is omitted for the sake of simplicity.

In this example, beneficially, there is no need for the SeNB 5-2 to forward any time information identifying the time when a particular data packet was received by the mobile telephone 3 (as indicated by an associated tAck(i) provided by its MAC entity). Instead, the SeNB 5-2 is configured to receive downlink data packets for the mobile telephone 3 from the MeNB 5-1 (e.g. via the X2 interface) as in the previous embodiment. However, in this case the SeNB 5-2 is also configured to log (using its RLC entity) the time when each data packet is received at the RLC upper SAP of the SeNB 5-2, which effectively corresponds to the point in time when L2 processing by the SeNB 5-2 is initiated.

For example, the SeNB 5-2 may log the time when each data packet is received at the RLC upper SAP as the time value tArriv(i). The SeNB 5-2 may be configured to derive (using its L2 measurement module 69) a packet delay value for the split bearer using the tArriv(i) logged by its RLC entity and the corresponding tAck(i) logged by its MAC entity. In other words, the time value tArriv(i) indicating the arrival of a particular data packet (forming part of a PDCP SDU) is logged by the RLC entity rather than by the PDCP entity (which in case of a split bearer is comprised in the MeNB).

In this case, the packet delay value for the split bearer may be referred to as an SeNB-specific packet delay value. Beneficially, such an SeNB-specific packet delay value would result in a more accurate representation of the delay resulting from the processing of data packets by the SeNB 5-2, since this value excludes any additional delay introduced by the X2 interface and/or any delay introduced by the master base station 5-1.

It will be appreciated that the SeNB 5-2 may be configured to report (e.g. using its X2 module 68) the result of this RLC time stamp based packet delay calculation to the MeNB 5-1, e.g. as part of the embodiment described with reference to FIG. 8 below.

Operation—Third Embodiment

Figure 7:
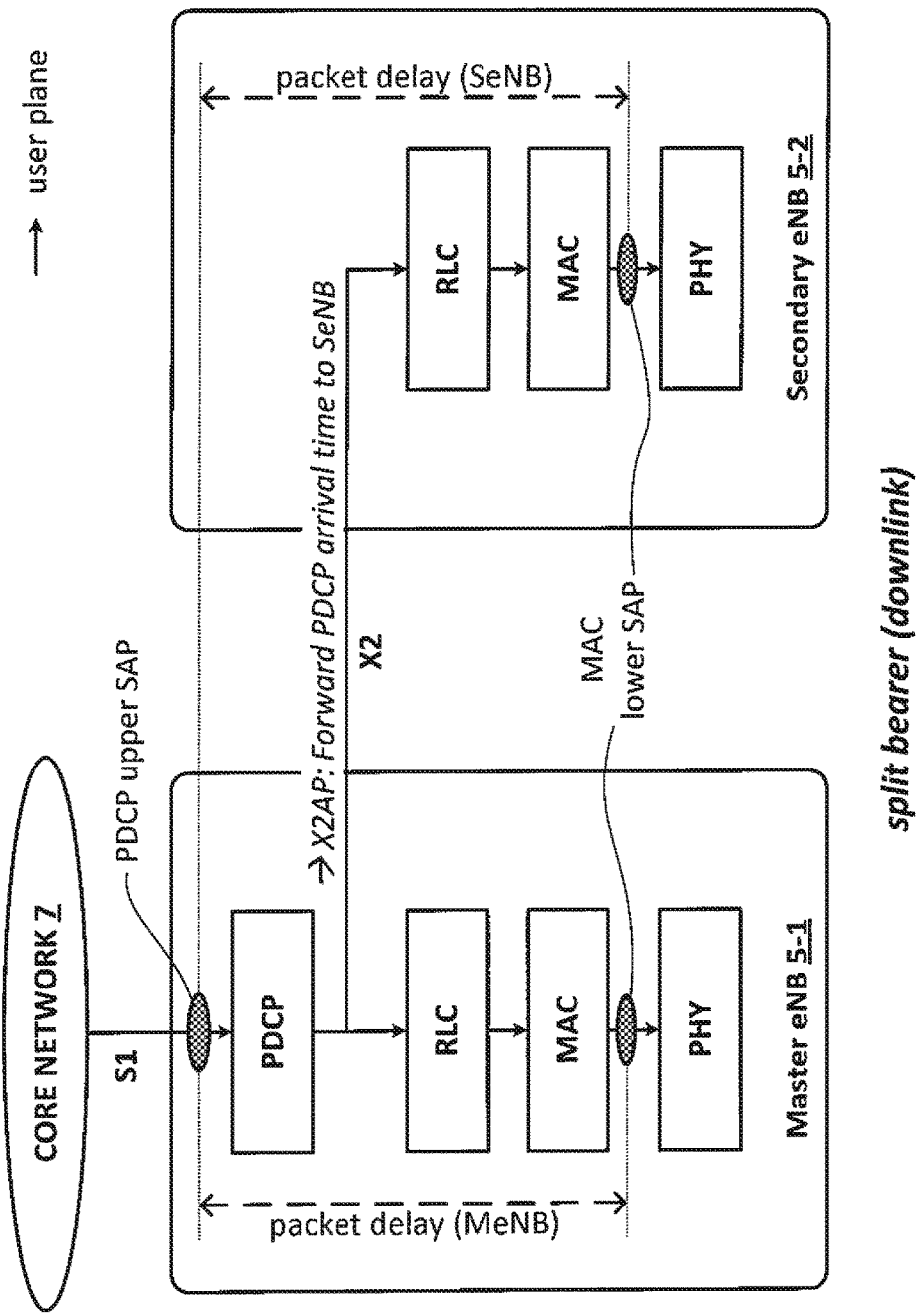

FIG. 7 illustrates an exemplary bearer split configuration according to an embodiment of the present invention. In FIG. 7, the protocol layers correspond to the protocol layers described with reference to FIG. 5, thus their description is omitted for the sake of simplicity.

In this example, similarly to the example described with reference to FIG. 6, there is also no need for the SeNB 5-2 to forward any time information identifying the time when a particular data packet was received by the mobile telephone 3 (as indicated by an associated tAck(i) provided by its MAC entity).

Instead, the MeNB 5-1 is configured to forward, to the SeNB 5-2 over the X2 interface, information identifying the time (e.g. an associated tArriv(i) value) when a particular data packet was received by its PDCP entity. For example, the MeNB 5-1 may be configured to attach (using its dual connectivity module 65) timing information to each data packet it receives from the core network 7 (or at least to those data packets that should be used by the SeNB 5-2 to calculate a packet delay).

Upon receipt of the data packets including the associated the timing information tArriv(i), the SeNB 5-2 stores the tArriv(i) in its memory 59. When the data packet has been successfully transmitted to the mobile telephone 3, and the MAC entity has obtained an associated time value tAck(i), the SeNB 5-2 (e.g. using its dual connectivity module 65) associates the tAck(i) with the tArriv(i) stored in memory 59 (possibly along with information identifying the QoS class of that data packet).

Thus, when the SeNB 5-2 needs to derive the packet delay (e.g. for data packets belonging to a particular QoS class), the SeNB 5-2 takes the respective pairs of tAck(i) and tArriv(i) for those data packets that need to be included in the calculation and derives the packet delay, e.g. using the equation described above.

Beneficially, in this embodiment the SeNB 5-2 is able to work out the total L2 packet delay (i.e. from all the way from the PDCP layer to the MAC layer involved in transmitting the data packets) instead of the SeNB-specific L2 packet delay only, as in the previous embodiment. It will be appreciated that the SeNB 5-2 may provide the calculated packet delay to other communication nodes, e.g. the MeNB 5-1 and/or an OAM entity, as appropriate.

Operation—Fourth Embodiment

Figure 8:
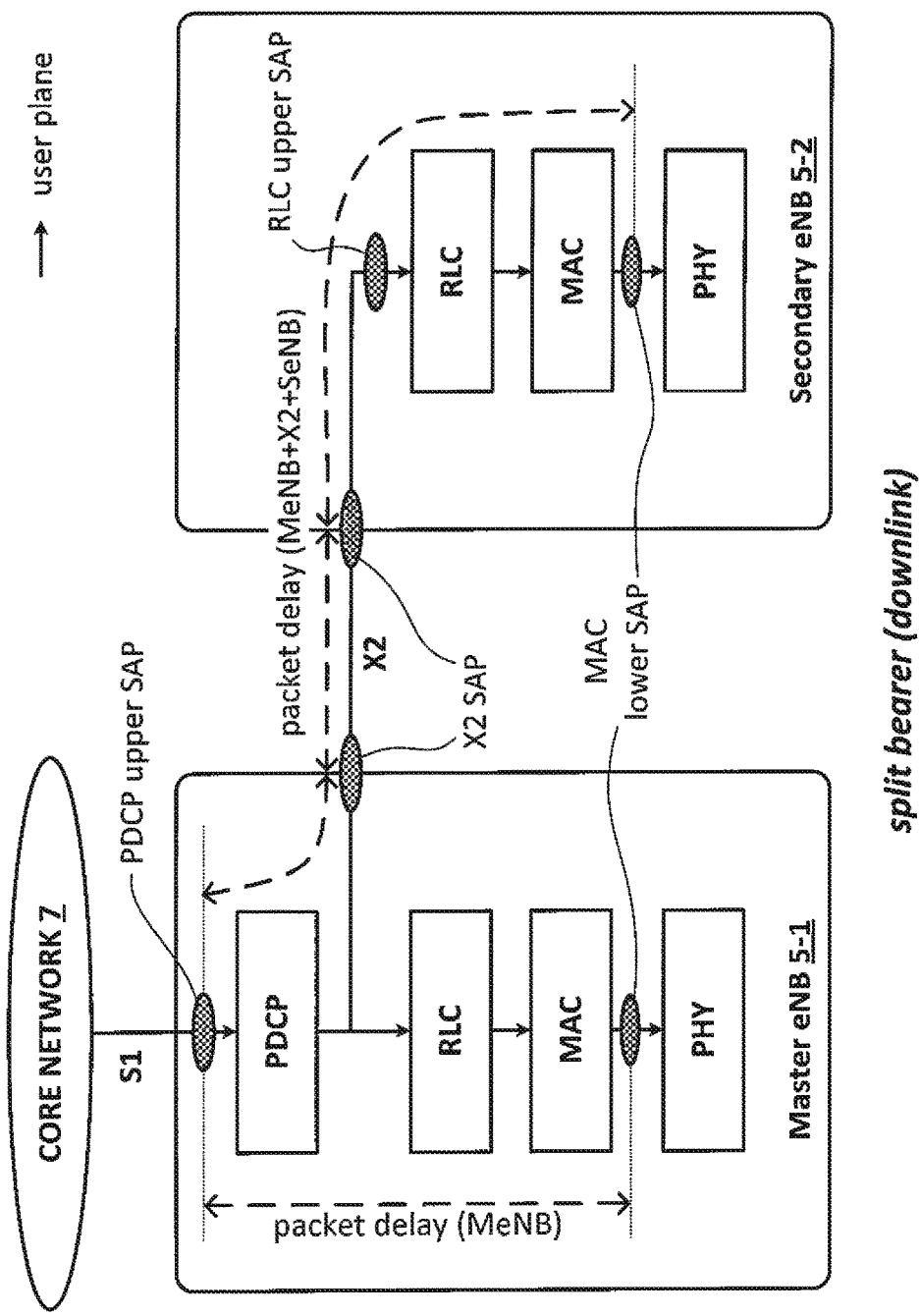

FIG. 8 illustrates an exemplary bearer split configuration according to an embodiment of the present invention. In FIG. 8, the protocol layers correspond to the protocol layers described with reference to FIG. 5, thus their description is omitted for the sake of simplicity.

In this example, the base stations 5-1, 5-2 are each configured to determine (using their respective L2 measurement modules 69) a different respective part of a 'composite' packet delay value, which comprises:

i) one part, derived by the MeNB 5-1, comprising an MeNB 5-1 specific 'internal' packet delay measured between receipt of a data packet by the MeNB's 5-1 PDCP entity from the core network 7 (e.g. at the PDCP upper SAP) and successful transmission of that data packet over the X2 interface (e.g. based on the time of receipt, by the X2 module 68 of the MeNB 5-1, of an acknowledgement from the SeNB 5-2 for that data packet); and ii) one part, derived by the SeNB 5-2, comprising an SeNB 5-2 specific 'internal' packet delay measured between receipt of a data packet over the X2 interface (e.g. at the RLC upper SAP of the SeNB 5-2) and a time stamp provided by the MAC entity of the SeNB 5-2, of a corresponding acknowledgement from the mobile telephone 3 of the successful receipt of that data packet by the mobile telephone 3.

The composite delay value may thus be derived, by the L2 measurement module 69 of one (or both) of the two base stations 5-1, 5-2, from the two parts (subsequent to receiving the other base station's part over the X2 interface using their respective X2 modules 68).

Modifications and Alternatives

Detailed embodiments have been described above. As those skilled in the art will appreciate, a number of modifications and alternatives can be made to the above embodiments whilst still benefiting from the inventions embodied therein.

In the above examples, the MeNB is described to comprise a macro base station. However, it will be appreciated that the MeNB may comprises any type of base station, e.g. a pico base station, a femto base station, a home base station. Further, it will be appreciated that either of the carriers F1 and/or F2 may be provided via a relay, a remote radio head, and/or the like instead of a base station.

In the above examples, each base station is described to provide a single carrier (F1 or F2). However, it will be appreciated that each base station may provide a plurality of carriers (e.g. the same and/or different set of carriers).

In the above examples, the packet delay calculations are performed for the split bearers only. However, it will be appreciated that 'regular' packet delay calculations may be also performed (by each base station) for the base station's own bearers, in which case two separate packet delay values may be derived (one for the base station specific bearers and one for the split bearers).

It will also be appreciated that packet delay calculations for the split bearer may be combined with either the MeNB-specific packet delay calculations or the SeNB-specific packet delay calculations, as appropriate. In this case, the L2 measurement module may be configured to obtain PDCP time stamps from the MeNB and to obtain MAC timestamps from both the MeNB (for MeNB-specific bearers and for split bearers) and the SeNB (for SeNB-specific bearers and split bearers) and to derive a combined packet delay value using such obtained time stamps.

It will be appreciated that whilst the above examples are described with reference to a communication bearer of the 'split' type, the description is equally applicable to any other types of communication bearers, including MeNB-specific and/or SeNB-specific communication bearers (e.g. as specified in 3GPP TR 36.842).

In the above embodiments, the X2 interface is described to carry information relating to time of receipt (by the PDCP entity, the RLC entity, and/or the mobile telephone) of data packets. It will be appreciated that this time of receipt information may comprise a time value derived based on a reference time value common to both the MeNB and the SeNB, e.g. based on a GPS time or a time value in accordance with the IEEE 1588 standard.

It will be appreciated that the MeNB may be configured to work out the delay resulting from communicating a data packet using the split bearer, based on the PDCP time stamp information and the MeNB's own MAC time stamp information associated with that particular data packet (or by averaging the respective delays associated with a plurality of data packets). Whilst in this case the packet delay calculation would effectively exclude the actual delays resulting from transmitting data packets via the SeNB, it will be appreciated that, on average, the packet delay calculated based solely on the MeNB's PDCP time stamp information and MAC time stamp information would (at least implicitly) provide a sufficiently accurate estimate of a packet delay via the SeNB (i.e. a packet delay calculated based on the SeNB's MAC time stamp information). This is because the additional buffering/processing by the SeNB, and any delay introduced by the X2 interface would necessarily result in an increased buffering of data packets prior to processing the data packets at the PDCP layer as well. In other words, data packets communicated over a split bearer would experience the same (or similar) delay regardless whether they are delivered via the MeNB and/or the SeNB. Further, it will be appreciated that acknowledgements coming by the (same) mobile telephone will take approximately the same amount of time to receive by both the MeNB and the SeNB (assuming radio conditions are comparable). Even if one of the MeNB's and the SeNB's radio link (F1, F2) has inferior radio conditions resulting on potentially delayed communication of radio packets via the base station operating that radio link, such a potential delay would eventually also increase the buffering time at the PDCP layer (i.e. the time it takes from receipt of a data packet from the core network to begin PDCP processing).

It will also be appreciated that the MeNB may be configured to determine a separate packet delay values for the split bearers and for the other (i.e. non-split) bearers corresponding to the same QCI. In this case, the MeNB (or the SeNB) may be configured to ignore any PDCP and MAC time stamps relating to split bearers when calculating the packet delay for the non-split bearers, and to ignore any PDCP and MAC time stamps relating to non-split bearers when calculating the packet delay for the split bearers.

In the above embodiments, the MeNB and the SeNB are described to perform packet delay measurements as an exemplary L2 measurement. However, it will be appreciated that the MeNB and the SeNB may be configured to perform any other type of L2 measurements specified in TS 36.314, e.g. the measurements illustrated in Table 2 below.

In particular, the above embodiments may be applicable to the "Packet Discard Rate in the DL per QCI" measurement, which indicates the number of data packets discarded during a given time period in the PDCP, RLC or MAC layers due to reasons other than hand-over. Thus, it will be appreciated that the MeNB may be configured to provide, to the SeNB over the X2 interface, information identifying the number of data packets discarded during a given time period in the PDCP layer. Based on this information, the SeNB may be able to determine the "Packet Discard Rate in the DL per QCI" measurement, if appropriate.

It will also be appreciated that the SeNB may be configured to provide, to the MeNB over the X2 interface, information identifying the number of data packets discarded during a given time period in the RLC and/or MAC layers. Based on this information, the MeNB may be able to determine the "Packet Discard Rate in the DL per QCI" measurement, if appropriate.

Alternatively, a new measurement may be performed by the SeNB in order to determine a packet discard rate at the SeNB, e.g. by considering the number of data packets discarded in the SeNB's flow control buffer and/or RLC entity, and by considering an associated (SeNB-specific) discard timer.

In case of other L2 measurements, it will be appreciated that 'regular' L2 measurements may be also performed (by each base station) for the base station's own bearers, in which case two separate measurements may be made (one for the base station specific bearers and one for the split bearers).

It will be appreciated that the base stations (MeNB and SeNB) may be configured to provide each other the results of their L2 measurements. In principle, such provision of L2 measurement results may be based on the so-called resource status indication procedure defined in 3GPP TS 36.423 (V12.1.0), the contents of which are incorporated herein by reference. For example, the results of PRB usage measurement (i.e. the first measurement in Table 2) may be exchanged over the X2 interface using a request/response procedure between two base stations. Similarly, the results of any packet delay measurement (irrespective of the method used) may also be reported in a similar fashion.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop/tablet computers, web browsers, etc.

In the embodiments described above, the mobile telephone and the base stations will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base stations as a signal over a computer network, or on a recording medium. Further, the functionality performed by part or all of this software may be performed using one or more dedicated hardware circuits.

It will be appreciated that one of said first time information and said second time information may be obtained via said communication link.

The base station may be configured to operate as a master base station of said dual connectivity configuration and said obtaining means may be operable to obtain said first time information and said second time information when said base station is operating as a master base station. In this case, the second time information may be obtained via said communication link.

The obtaining means may be operable to obtain said second time information by estimating said time when at least part of said data packet communicated using said communication bearer was acknowledged in said further base station to be equal to the time when at least part of said data packet communicated using said communication bearer was acknowledged in said base station (e.g. in a MAC part thereof) configured to operate as a master base station.

The base station may be configured to operate as a secondary base station of said dual connectivity configuration and said obtaining means may be operable to obtain said first time information and said second time information when said base station is operating as a secondary base station. In this case, the first time information may be obtained via said communication link.

The obtaining means may be operable to obtain said first time information by estimating said time when PDCP processing started based on a time when radio link control (RLC) processing started for said data packet in said secondary base station. The obtaining means may be operable to estimate said first time information to be at least one of: equal to the time when RLC processing started; and equal to the time when RLC processing started less a predetermined offset.

The first time information may identify a delay time from the time when PDCP processing started for a data packet communicated using said communication bearer to a time when said data packet was communicated over said communication link. The second time information may identify a delay time from a time when RLC processing started for said data packet (or from a time when said data packet was communicated over said communication link) to said time when at least part of said data packet communicated using said communication bearer was acknowledged by said mobile communication device.

The communication bearer may be associated with a quality of service class identifier (QCI). In this case, the determining means may be operable to calculate: i) a packet delay specific to the QCI associated with said communication bearer by taking into account said obtained first and second time information; and ii) a packet delay specific to a different QCI than the QCI associated with said communication bearer by discarding said obtained first and second time information.

The determining means may be operable to calculate said packet delay specific to the QCI associated with said communication bearer based on the following equation:

$$M(T, qci) = \left\lfloor \frac{\sum_{\forall i} tAck(i) - tArriv(i)}{I(T)} \right\rfloor$$

wherein M(T, qci) denotes said packet delay, i denotes an identifier for a particular data packet transmitted using said communication bearer; tArriv(i) denotes said first time information for data packet i, tAck(i) denotes said second time information for data packet i, T denotes a time period during for which said calculation is performed; I(T) denotes the total number of data packets communicated during said time period T; and $\lfloor \; \rfloor$ is a flooring function.

The first part may comprise a packet data convergence protocol (PDCP) part in which PDCP processing is performed. The second part may comprise a media access control (MAC) part in which MAC processing is performed.

Various other modifications will be apparent to those skilled in the art and will not be described in further detail here.

Glossary of 3GPP Terms

DC—Dual Connectivity
DL—Downlink

DRB—Data Radio bearer
eNB—Evolved NodeB, E-UTRAN base station
EPC—Evolved Packet Core
EPS—Evolved Packet System
E-UTRA—Evolved UMTS Terrestrial Radio Access
E-UTRAN—Evolved UMTS Terrestrial Radio Access Network
HARQ—Hybrid Acknowledge Request
LTE—Long Term Evolution (of UTRAN)
MAC—Media Access Control
MeNB—Master eNB
MME—Mobility Management Entity
NAS—Non-Access-Stratum
OAM—Operation and Maintenance
PDCP—Packet Data Convergence Protocol
PHY—Physical Layer (L1)
P-GW—PDN Gateway
QCI—Quality of Service (QoS) Class Identifier
RLC—Radio Link Control
RRC—Radio Resource Control
S1-MME—S1 for the control plane
S1-U—S1 for the user plane
SAP—Service Access Point
SDU—Service Data Unit
SeNB—Secondary eNB
S-GW—Serving Gateway
UE—User Equipment
UL—Uplink The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. Introduction eNB L2 measurements are specified in 36.314. These measurements will be performed by an eNB independent of its role as MeNB or SeNB. However, it seems few measurements in an eNB which has UEs configured with split bearers in dual connectivity need further discussion.

1 2. Discussion

In our understanding, L2 eNB measurements will be performed by an eNB independent of its role as MeNB or SeNB. These roles are per UE and ideally same eNB may act as both MeNB and SeNB for different UEs.

Proposal 1: eNB Will Perform L2 Measurements as Specified in 36.314 Irrespective of its Role as MeNB or SeNB.

If proposal 1 is agreed then eNB measurements shall include UEs configured with dual connectivity while performing these measurements. For example, PRB usage per cell shall include resources utilised by DC UEs because the measurement is to simply measure PRB usage in a cell and does not classify further based on UE configurations.

Proposal 2: L2 Measurements Include Resources Related to DC UEs for these Measurements If proposal 2 is agreed then no problem is foreseen for SCG bearers because PDCP, RLC, MAC layers reside in SeNB for these bearers and measurements will be equivalent to measurements performed for non-DC UEs.

However, split bearers will use different resources in the involved eNBs depending on their role as MeNB or SeNB. The accuracy may also be affected due to additional buffering for some of the measurements. The table below lists eNB measurements, measurement definition and remarks when split bearers are configured.

TABLE 2

L2 measurements (TS 36.314)

| eNB measurement | 36.314 Definition | Remark |
|---|---|---|
| Total PRB usage | Total PRB usage is calculated in the time-frequency domain only. The reference point is the Service Access Point between MAC and L1. The measurement is done separately for:<br>DL<br>UL<br>Detailed Definitions:<br><br>$$M(T) = \left\lfloor \frac{M1(T)}{P(T)} * 100 \right\rfloor$$ | These are cell resources and it does not matter if occupied by DC UE or non-DC UEs.<br>No change is foreseen to the existing definition. |
| PRB usage per traffic class | PRB usage per traffic class. This measurement is an aggregate for all UEs in a cell, and is applicable to Dedicated Traffic Channels (DTCH). The reference point is the Service Access Point between MAC and L1. The measurement is done separately for:<br>DL DTCH, for each QCI.<br>UL DTCH, for each QCI<br>Detailed Definitions:<br><br>$$M1(qci, T) = \sum_{\forall t} \sum_{\forall p \in S(t)} \frac{1}{W(p)} * X(t) * \frac{B(t, qci)}{B(t)},$$<br><br>where explanations can be found in the table 4.1.1.2-1 of TS 36.314.<br><br>$$M(qci) = \left\lfloor \frac{M1(qci, T)}{P(T)} * 100 \right\rfloor,$$ | Measurement is performed per QCI for all UEs.<br>No change is foreseen to the existing definition |

TABLE 2-continued

L2 measurements (TS 36.314)

| eNB measurement | 36.314 Definition | Remark |
| --- | --- | --- |
| Received Random Access Preambles | Received Random Access Preambles. This measurement is applicable to PRACH. The reference point is the Service Access Point between MAC and L1. The measured quantity is the number of received Random Access preambles during a time period over all PRACHs configured in a cell. The measurement is done separately for:<br>Dedicated preambles<br>Randomly selected preambles in the low range<br>Randomly selected preambles in the high range.<br>The unit of the measured value is [/s]. | In general, RA procedure is permitted on SeNB for DC UEs. But, no change is foreseen to existing definition as independent operation is possible. |
| Number of Active UEs in the DL per QCI | Number of Active UEs in the DL per QCI. This measurement refers to UEs for which there is buffered data for the DL for DRBs. measurement is done separately per QCI.<br>Detailed Definition:<br>$$M(T, qci, p) = \left\lfloor \frac{\sum_{\forall i} N(i, qci)}{I(T, p)} \right\rfloor,$$ | DC UE may be a scheduling candidate in two schedulers. If the purpose is to measure scheduling candidate UEs, existing definition is sufficient and no change is required. |
| Number of Active UEs in the UL per QCI | Number of Active UEs in the UL per QCI. This measurement refers to UEs for which there is buffered data for the UL for DRBs. The measurement is done separately per QCI.<br>Detailed Definition:<br>$$M(T, qci, p) = \left\lfloor \frac{\sum_{\forall i} N(i, qci)}{I(T, p)} \right\rfloor$$ | If the purpose of this measurement is to measure the number of potential UL scheduling candidates then existing definition is sufficient to cover DC UEs. Even though UL bearer split is not supported. |
| Packet Delay in the DL per QCI | Packet Delay in the DL per QCI. This measurement refers to packet delay for DRBs. For arrival of packets the reference point is PDCP upper SAP. For successful reception the reference point is MAC lower SAP. The measurement is done separately per QCI.<br>Detailed Definition:<br>$$M(T, qci) = \left\lfloor \frac{\sum_{\forall i} tAck(i) - tArriv(i)}{I(T)} \right\rfloor,$$ | The measurement cannot be performed in SeNB based on current definition for a split bearer. Because PDCP upper SAP resides in MeNB and HARQ ack/nack is received in both M/SeNB |
| Packet Discard Rate in the DL per QCI | DL Packet discard rate:<br>Packet Discard Rate in the DL per QCI. This measurement refers to discard for DRBs. One packet corresponds to one PDCP SDU. The reference point is PDCP upper SAP. The measurement is done separately per QCI.<br>Detailed Definition:<br>$$M(T, qci) = \left\lfloor \frac{Ddisc(T, qci) * 1000000}{N(T, qci)} \right\rfloor$$ | PDCP SDU which could not be transmitted over the SeNB, may be measured by PDCP entity residing in the MeNB.<br>This measurement may also be performed in SeNB if strict definition of upper PDCP SAP as a reference point is not considered. But current text restricts this measurement to be performed in SeNB for a split bearer.<br>The measurement results may be impacted by buffering for the purpose of flow control. |
| Packet Uu Loss Rate in the DL per QCI | Packet Uu Loss Rate in the DL per QCI. This measurement refers to packet loss for DRBs. One packet corresponds to one PDCP SDU. The measurement is done separately per QCI.<br>Detailed Definition: | No SAP specified for measurement. SeNB can also perform this measurement for split bearer. |

TABLE 2-continued

L2 measurements (TS 36.314)

| eNB measurement | 36.314 Definition | Remark |
|---|---|---|
| | $$M(T, qci) = \left\lfloor \frac{Dloss(T, qci) * 1000000}{N(T, qci) + Dloss(T, qci)} \right\rfloor,$$ | |
| Packet Loss Rate in the UL per QCI | Packet Loss Rate in the UL per QCI. This measurement refers to packet loss for DRBs. One packet corresponds to one PDCP SDU. Reference point is the PDCP upper SAP. The measurement is done separately per QCI.<br>Detailed Definition:<br>$$M(T, qci) = \left\lfloor \frac{Dloss(T, qci) * 1000000}{N(T, qci)} \right\rfloor,$$ | Measurement reference point is PDCP upper SAP. There is no UL bearer split so PDCP in MeNB will always be able to measure even though UL path is via SeNB. SeNB may also perform this measurement by looking into PDCP header. No change foreseen. |
| Scheduled IP Throughput in DL | Scheduled IP Throughput in DL. Throughput of PDCP SDU bits in downlink for packet sizes or data bursts that are large enough to require transmissions to be split across several TTIs, by excluding transmission of the last piece of data in a data burst. Only data transmission time is considered, i.e. when data transmission over Uu has begun but not yet finished. Each measurement is a real value representing the throughput in kbits/s. The measurement is performed per QCI per UE. For successful reception, the reference point is MAC upper SAP. This measurement is obtained by the following formula for a measurement period:<br><br>If $\sum \text{ThpTimeDl} > 0$,<br><br>$$\frac{\sum \text{ThpVolDl}}{\sum \text{ThpTimeDl}} \times 1000 \, [\text{kbits/s}]$$<br><br>If $\sum \text{ThpTimeDl} = 0$,<br><br>0 [kbits/s] | No change foreseen. |
| Scheduled IP Throughput in UL | Scheduled IP Throughput in UL. eNB estimate of the throughput of PDCP SDU bits in uplink for packet sizes or data bursts (where a UL data burst is the collective data received while the eNB estimate of the UE buffer size is continuously above zero) that are large enough to require transmissions to be split across several TTIs, by excluding transmission of the last piece of data. Only data transmission time is considered, i.e. when data transmission over Uu has begun but not yet finished. Each measurement is a real value representing the throughput in kbits/s. The measurement is performed per QCI per UE. For successful reception, the reference point is MAC upper SAP.<br>This measurement is obtained by the following formula for a measurement period:<br><br>If $\sum \text{ThpTimeUl} > 0$,<br><br>$$\frac{\sum \text{ThpVolUl}}{\sum \text{ThpTimeUl}} \times 1000 \, [\text{kbits/s}]$$<br><br>If $\sum \text{ThpTimeUl} = 0$,<br><br>0 [kbits/s] | No change foreseen. |

We look into two measurements in slight details:
Packet Delay in the DL Per QCI

The measurement is performed per QCI in terms of measuring the packet arrival time at upper PDCP SAP and successful reception indication from the UE in terms of HARQ feedback. For a split bearer (as shown in e.g. FIG. 5), PDCP resides in MeNB and MAC resides in MeNB and SeNB. So SeNB may not be aware of packets arrival time unless the arrival time is sent over X2 interface to the SeNB. If MeNB performs this measurement then acknowledgement time shall be exchanged over X2. This timing over X2 interface has to be in terms of global time unit e.g. based on GPS time or IEEE 1588 etc. Alternatively, SeNB can perform the measurement considering the arrival time in the RLC upper SAP or a new measurement may be defined considering delay measurement in different legs i.e. MeNB and SeNB measures packet delays separately.

Packets related to split bearers may encounter more delay due to buffering in order to account for the flow control and non-ideal backhaul delay. So, overall measurements including split and non-split bearers may provide less attractive results, if same QCI has combination of both types of bearers, due to the presence of split bearer measurements.

Packet Discard Rate in the DL Per QCI

This measurement also has the same problem as packet delay because it includes packets discarded in different layers. The measurement is performed per QCI and SeNB does not have the information about if any packet has been discarded at PDCP in MeNB. It should be enough to count PDCP discard in one eNB i.e. MeNB. It may be discussed if any change in the existing definition is necessary or to agree that SeNB does not perform this measurement on the packets in the buffers occupied by a QCI belonging to split bearers.

Proposal 3: Discuss for a Split Bearer Case the Following Measurements
Packet Delay in the DL per QCI
Packet Discard Rate in the DL per QCI

CONCLUSION

We propose RAN2 to discuss and agree following proposals:
Proposal 1: eNB will perform L2 measurements as specified in 36.314 irrespective of its role as MeNB or SeNB
Proposal 2: L2 measurements include resources related to DC UEs for these measurements
Proposal 3: Discuss for a split bearer case the following measurements
Packet Delay in the DL per QCI
Packet Discard Rate in the DL per QCI
2 References
1. 3GPP TS 36.314
2. 3GPP TR 36.842

This application is based upon and claims the benefit of priority from United Kingdom patent application No. 1408276.2, filed on May 9, 2014, the disclosure of which is incorporated herein in its entirety by reference.

The invention claimed is:

1. A base station configured to operate as part of a dual connectivity configuration in which a communication bearer between a core network and a user communication device is provided via the base station and a further base station, said base station comprising:
at least one non-transitory memory operable to store program code; and
at least one processor operable to read the program code and configured to operate as instructed by the program code, the program code including:
establishing code that causes the at least one processor to establish said communication bearer with said user communication device via a communication link over a base station to base station interface between said base station and said further base station, wherein said communication bearer comprises:
a first part, in one of said base station and said further base station, where first processing is performed; and
a second part, in the other of said base station and said further base station, where second processing is performed; and
obtaining code that causes the at least one processor to obtain:
i) first time information representing a time when said first processing with regard to a packet data convergence protocol (PDCP) started, in said further base station operating as a master base station of said dual connectivity configuration, for a data packet communicated using said communication bearer; and
ii) second time information representing a time when at least part of said data packet communicated using said communication bearer was acknowledged, in said base station operating as a secondary base station of said dual connectivity configuration, by said user communication device; and
determining code that causes the at least one processor to determine a packet delay based on said obtained first time information and second time information, wherein
said communication bearer is split, at said further base station operating as said master base station, into said first and second parts, and
said obtaining code further causes the at least one processor to obtain the first time information by estimating a time when radio link control (RLC) processing started for said data packet in said base station operating as said secondary base station.

2. The base station according to claim 1, wherein said obtaining code further causes the at least one processor to estimate said first time information to be at least one of: equal to the time when the radio link control (RLC) processing started; and equal to the time when the RLC processing, started less a predetermined offset.

3. The base station according to claim 1, wherein said first time information identifies a delay time from said time when packet data convergence protocol (PDCP) processing started for a data packet communicated using said communication bearer to a time when said data packet was communicated over said communication link.

4. The base station according to claim 1, wherein said second time information identifies a delay time from a time when radio link control (RLC) processing started for said data packet (or from a time when said data packet was communicated over said communication link) to said time when at least part of said data packet communicated using said communication bearer was acknowledged by said mobile communication device.

5. The base station according to claim 1, wherein said communication bearer is associated with a quality of service class identifier, QCI, and wherein said determining code further causes the at least one processor to calculate:
i) a packet delay specific to the QCI associated with said communication bearer by taking into account said obtained first and second time information; and
ii) a packet delay specific to a different QCI than the QCI associated with said communication bearer by discarding said obtained first and second time information.

6. The base station according to claim 5, wherein said determining code further causes the at least one processor to calculate said packet delay specific to the QCI associated with said communication bearer based on the following equation:

$$M(T, qci) = \left\lfloor \frac{\sum_{\forall i} tAck(i) - tArriv(i)}{I(T)} \right\rfloor$$

wherein M(T, qci) denotes said packet delay, i denotes an identifier for a particular data packet transmitted using said communication bearer; tArriv(i) denotes said first time information for data packet i, tAck(i) denotes said second time information for data packet i, T denotes a time period during for which said calculation is performed; I(T) denotes the total number of data packets communicated during said time period T; and
$\lfloor \ \rfloor$ is a flooring function.

7. The base station according to claim 1, wherein said first part comprises a packet data convergence protocol (PDCP) part in which PDCP processing is performed.

8. The base station according to claim 1, wherein said second part comprises a media access control (MAC) part in which MAC processing is performed.

9. A system comprising a base station apparatus according to claim 1 and a user communication device.

10. A method performed by a base station apparatus comprising a master base station and a secondary base station configured to operate as part of a dual connectivity configuration in which a communication bearer between a core network and a user communication device is provided via the said master base station and said secondary base station, the method comprising: establishing said communication bearer with said user communication device via a communication link over a base station to base station interface between said master base station and said secondary base station, wherein said communication bearer comprises:
 a first part, in one of said master base station and said secondary base station, where first processing is performed; and
 a second part, in the other of said master base station and said secondary base station, where second processing is performed; and
obtaining:
 i) first time information representing a time when said first processing with regard to a packet data convergence protocol (PDCP) started, in said master base station, for a data packet communicated using said communication bearer; and
 ii) second time information representing a time when at least part of said data packet communicated using said communication bearer was acknowledged, in said secondary base station, by said user communication device; and
determining a packet delay based on said obtained first time information and second time information, wherein
said communication bearer is split, at said master base station, into said first and second parts, and
said obtaining comprises obtaining the first time information by estimating a time when radio link control (RLC) processing started for said data packet in said secondary base station.

11. A non-transitory computer readable medium comprising computer implementable instructions for causing a programmable communications device to perform the method of claim 10.

* * * * *